(12) United States Patent
Obergfell et al.

(10) Patent No.: US 10,452,125 B2
(45) Date of Patent: Oct. 22, 2019

(54) APPARATUS FOR ACTIVATING AN ELECTRICALLY OR ELECTRONICALLY CONTROLLED APPLIANCE FROM AN ENERGY-SAVING PASSIVE STATE

(71) Applicants: MARQUARDT GMBH, Rietheim-Weilheim (DE); ATMEL CORPORATION, San Jose, CA (US)

(72) Inventors: Robert Obergfell, Donaueschingen (DE); Sascha Wagner, Heilbronn (DE); Matthias Hofinger, Neu-Ulm (DE)

(73) Assignees: Marquardt GmbH, Rietheim-Weilheim (DE); Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 15/716,855

(22) Filed: Sep. 27, 2017

(65) Prior Publication Data

US 2018/0067540 A1 Mar. 8, 2018

Related U.S. Application Data

(63) Continuation of application No. PCT/EP2016/055220, filed on Mar. 11, 2016.

(30) Foreign Application Priority Data

Mar. 31, 2015 (DE) .......................... 10 2015 105 008

(51) Int. Cl.
*G06F 1/3287* (2019.01)
*G07C 9/00* (2006.01)
(Continued)

(52) U.S. Cl.
CPC ........ *G06F 1/3287* (2013.01); *G07C 9/00111* (2013.01); *G07C 9/00309* (2013.01);
(Continued)

(58) Field of Classification Search
CPC .... G06F 1/3287; B60R 25/24; G07C 9/00174
(Continued)

(56) References Cited

U.S. PATENT DOCUMENTS

| 6,208,239 B1 | 3/2001 | Müller et al. |
| 9,600,947 B2 * | 3/2017 | Obergfell ................ B60R 25/24 |

(Continued)

FOREIGN PATENT DOCUMENTS

| DE | 198 46 803 C1 | 9/2000 |
| DE | 20 2005 014 136 U1 | 2/2006 |

(Continued)

OTHER PUBLICATIONS

English translation of the International Preliminary Report on Patentability (Chapter I) (Application No. PCT/EP2016/055220) dated Oct. 12, 2017, 9 pages.

(Continued)

*Primary Examiner* — Qutbuddin Ghulamali
(74) *Attorney, Agent, or Firm* — Burr & Brown, PLLC

(57) ABSTRACT

An apparatus for activating an electrically or electronically controlled appliance from an energy-saving passive state, especially a locking system for locking and/or unlocking, in particular for an access and/or authorization and/or for other services for a wireless remote control, for controlling of front doors, for motor vehicles, or the like comprising a first device in the appliance and an associated second device designed in the type of an electronic key, an ID-transponder, a chip card or the like, wherein both devices for the intended operation have transmitters and/or receivers for electromagnetic signals is suggested which allows a large operation distance and a long battery lifetime of the second device. This is achieved in that the first device transmits a first cyclic repeated signal for the activation and/or authentication of the (Continued)

second device with a first data protocol within a first transmission time interval and with a first cycle time.

11 Claims, 2 Drawing Sheets

(51) Int. Cl.
*H04L 29/06* (2006.01)
*H04W 12/06* (2009.01)
*H04W 52/02* (2009.01)
*H04L 29/08* (2006.01)

(52) U.S. Cl.
CPC ...... *H04L 63/0492* (2013.01); *H04L 63/0853* (2013.01); *H04W 12/06* (2013.01); *H04W 52/0216* (2013.01); *G07C 2009/0038* (2013.01); *G07C 2009/00373* (2013.01); *G07C 2009/00396* (2013.01); *G07C 2009/00507* (2013.01); *H04L 67/12* (2013.01); *Y02D 70/00* (2018.01)

(58) Field of Classification Search
USPC .......................................... 340/5.63
See application file for complete search history.

(56) References Cited

U.S. PATENT DOCUMENTS

| | | |
|---|---|---|
| 2004/0100360 A1* | 5/2004 | Chandebois ............ B60R 25/24 340/5.72 |
| 2009/0073907 A1 | 3/2009 | Cai |
| 2014/0064174 A1 | 3/2014 | Abe et al. |
| 2015/0003311 A1 | 1/2015 | Feuersaenger et al. |
| 2015/0071179 A1 | 3/2015 | Zhang et al. |
| 2015/0348347 A1* | 12/2015 | Diz ...................... E05B 39/005 340/5.61 |
| 2018/0067540 A1* | 3/2018 | Obergfell ............ G07C 9/00309 |

FOREIGN PATENT DOCUMENTS

| | | | |
|---|---|---|---|
| DE | 10 2009 043 054 A1 | 3/2011 | |
| DE | 10 2010 036 787 A1 | 2/2012 | |
| EP | 1 867 535 A1 | 12/2007 | |
| GB | 2 515 007 A | 12/2014 | |

OTHER PUBLICATIONS

German Search Report (Application No. 10 2015 105 008.0) dated Nov. 30, 2015.
International Search Report and Written Opinion (Application No. PCT/EP2016/055220) dated Jun. 14, 2016.

* cited by examiner

APPARATUS FOR ACTIVATING AN ELECTRICALLY OR ELECTRONICALLY CONTROLLED APPLIANCE FROM AN ENERGY-SAVING PASSIVE STATE

CROSS REFERENCE TO RELATED APPLICATIONS

This application is a continuation of International Application No. PCT/EP2016/055220 filed Mar. 11, 2016, which designated the United States, and claims the benefit under 35 USC § 119(a)-(d) of German Application No. 10 2015 105 008.0 filed Mar. 31, 2015, the entireties of which are incorporated herein by reference.

FIELD OF THE INVENTION

The present invention relates to an apparatus for activating an electrically or electronically controlled appliance from an energy-saving passive state.

BACKGROUND OF THE INVENTION

Such apparatus are known for example as apparatus for locking and/or unlocking in particular for front doors, remote controls, car locking devices, etc. For example, in the document EP 1 867 535 B1 such an apparatus is disclosed.

In a known apparatus, a first device is arranged in a basis object i.e. in a building, a motor vehicle, etc., which is able to activate a second device designed in the type of an electronic key, an ID-transponder, a chip card or the like. Both devices for the intended apparatus have transmitters and/or receivers for electromagnetic signals.

In the known apparatus, the second device remains in a standby status when the second device is not in the operating mode.

When the second device comes into the receiving range of the first device, the first device activates the second device for further operating. In the standby mode the second device is in a status of little power consumption. Nevertheless this little power consumption is a limitation for the battery life time of the second device. For this reason, known apparatus for locking and/or unlocking are working with LF-transmitters to reduce the power consumption.

A disadvantage of such apparatus working with LF-transmitters is the small operating distance between the first and the second device.

SUMMARY OF THE INVENTION

An object of the present invention is to overcome this disadvantage and to allow an apparatus for activating an electrically or electronically controlled appliance from an energy-saving passive state with a larger operation distance between the first device and the second device without reducing the life time of the battery for the second device.

According to the present invention, the first device transmits a first cyclic repeated signal for the activation and/or authentication of the second device with a first data protocol within a first transmission time interval and with a first cycle time.

This allows a time controlled activation of the second device, preferably a so-called polling operation of the second device.

For this reason, the second device can be completely deactivated except the time controlled activated intervals, which can have a very low repeating rate and comparatively short active time intervals. So the power consumption of the second device can be reduced in a significant amount, which allows, for example, to use higher frequencies, VHF and/or UHF instead of LF frequencies for the transmitters and to increase the operation distance.

Preferably the second device has a cycled repeated receiving mode for a determined first receiving time interval of the second device. A cyclic repeated receiving mode realizes a polling operation mode for the second device and simplifies the time controlling of the second device.

Further preferably the first receiving time interval of the second device is longer than the first transmission time interval of a first data protocol of the first device.

Having this relation between the receiving time interval of the second device and transmission time interval of the first data protocol of the first device enables the second device to receive a complete first data protocol of the first device in the time controlled activated mode in the first receiving time interval of the second device.

Since the first transmission time interval of the first data protocol of the first device can be very short, the absolute time for the first receiving time interval of the second device is also short, even if it is longer than the first transmission time interval of the first data protocol of the first device. In combination with a very large cycle time for the cyclic repeated receiving mode of the second device a minimum of power consumption can be realized.

Advantageously the first device transmits a second or more cyclic repeated signals for authentication of a second device with a second data protocol within a second transmission time interval and with a second cycle time, wherein the first transmission time interval is shorter than the second transmission time interval and the first cycle time is shorter than the second cycle time.

So for the authentication of the second device a higher data volume can be transmitted than in the first data protocol, which has only the function to activate the time controlled second device.

In a preferred embodiment, the first receiving time interval of the second device is essentially a multiple of the first transmission time interval of the first data protocol.

With this relation the probability, that the second device receives the complete first data protocol is increased.

Preferably the first receiving time interval of the second device corresponds essentially to the first cycle time of the first device for activation of the second device. In this case there is a high probability, that the second device is able to receive in the first receiving time interval the first data protocol of the first device for activation of the second device.

Advantageously the second device remains or comes in a receiving mode for one or more second receiving time intervals after receipt of a first data protocol of the first device, within that the second or more signals of the first device for authentication of a second device with a second data protocol can be received completely by the second device.

So when the second device is activated by time control and having received the first data protocol of the first device the second device is able to wait for the second or more signals of the first device for authentication of the second device with a second data protocol. This second data protocol has a higher data volume than the first data protocol. Because of the activation of the second device the second device can receive completely a second data protocol in the one or more second receiving time intervals.

Advantageously the second receiving time interval of the second device in the receiving mode after the receipt of the first data protocol corresponds essentially to the second cycle time of the second or more signals of the first device.

These time adaption effects, that essentially the complete second cycle time of the second or more signals of the first device can be monitored by the second device because of a corresponding length of the second receiving time interval.

In special embodiments of the present invention, the second or more signals of the first device are divided in two or more blocks. Two or more data blocks can be arranged in a manner with a higher data transmission security.

In a particular embodiment of the present invention, the second device remains or comes in the receiving mode during a third receiving time interval in case of an at least partially overlap of the first receiving time interval of the second device with a second transmission time interval of the first device, within that the second or more signals of the first device with the second data protocol can be completely received by the second device.

In case of the at least partially overlap of the first receiving time interval of the second device with a second transmission time interval of the first device there might be an uncomplete data transmission between the second and the first device. For this case the second device remains or comes into the receiving mode during a third receiving time interval, to receive a repeated second data protocol completely.

Since according to the present invention the second device has a very low power consumption, there is a possibility to use higher frequencies for the carrier wave of the transmitters. Preferably the frequency of the carrier wave for the first and/or Second signal is in the VHF-range (30 MHz to 300 MHz) and/or UHF-range (300 MHz to 3 GHz). For example, a possibility for using a high frequency for the carrier wave is to slack the frequency for the carrier wave for the first and/or second signal higher than 100 MHz, preferably in the ISM band from 433.05 MHz to 434.79 MHz and/or in the ISM band from 902 MHz to 928 MHz.

These frequency ranges are admitted frequency bands, which in comparison to the prior art effect a significant longer operation distance between the first and the second device. These large operation distance can be used for new additional functions, for example in case of an application in a basis object like a building, a motor vehicle, etc. to switch the illumination even at a larger approaching distance of the second device to the first device in the basis object.

Of course other services can be used in an equivalent manner when approaching to the basis object, wherein those services can be initiated at relative large distances to the vehicle.

BRIEF DESCRIPTION OF THE INVENTION

An embodiment of the present invention is disclosed in the drawings and described with respect to the figures.

DETAILED DESCRIPTION OF THE INVENTION

Figure 1:
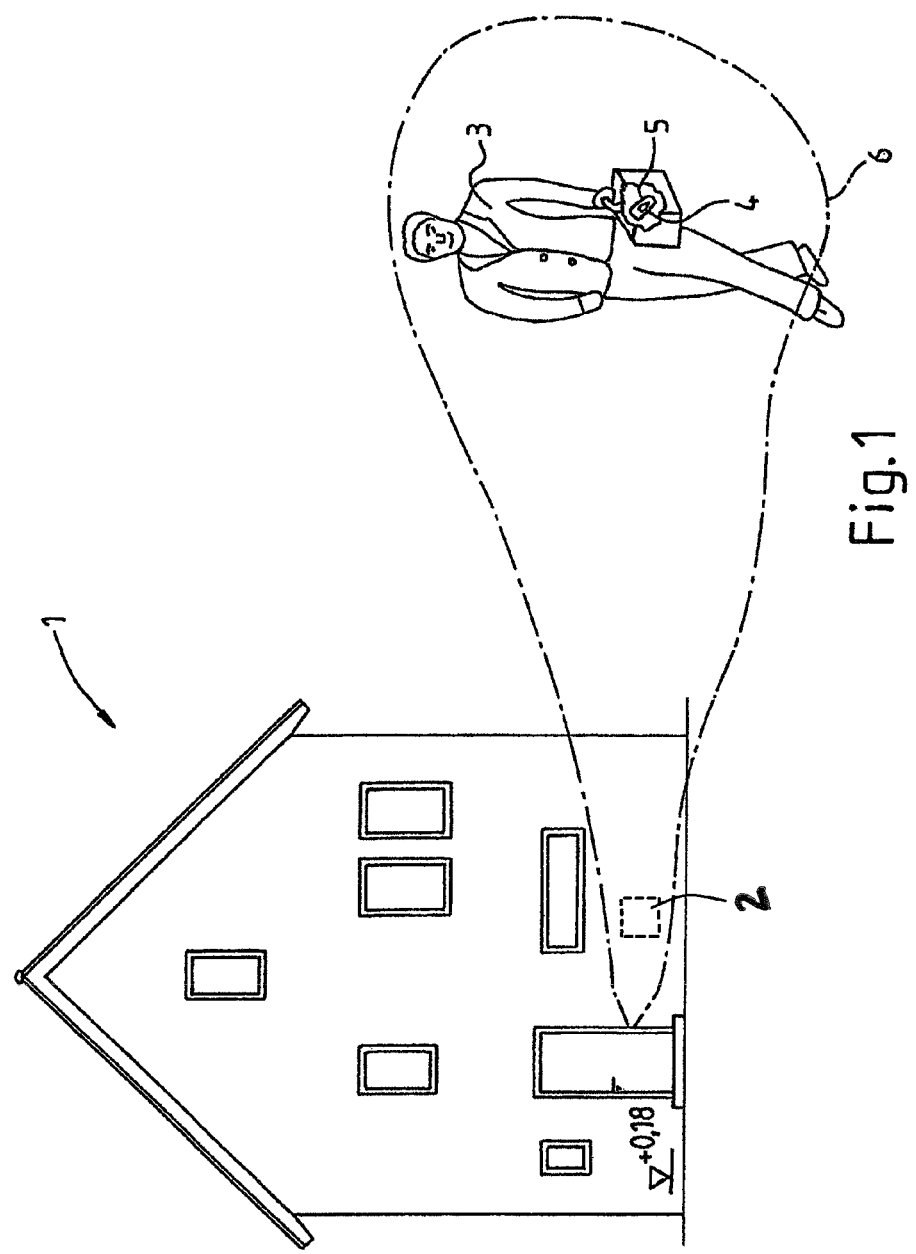
FIG. 1 shows a perspective view of a building and an operator of a building for illustrating the application.

In FIG. 1 a building 1 is shown, in which a first device 2 having a transmitter is arranged.

An operator 3 is carrying a handbag with the second device 4 inside, especially the key 5. When the operator approaches to the building the operator and the car key 5 are coming into the operation distance 6 between the first device 2 and the second device 4.

Figure 2:
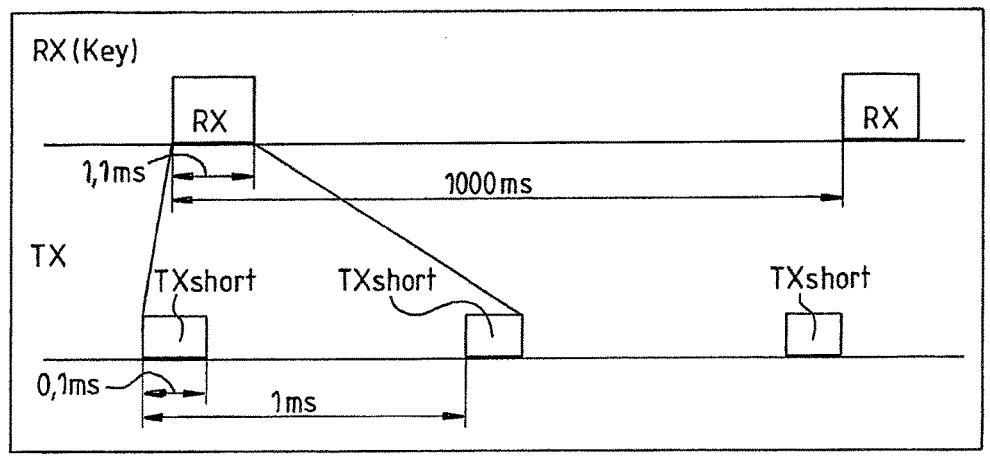
FIG. 2 shows a diagram as an example of a timing of the transmitting and receiving signals.

In FIG. 2 the first cycling repeated signal (TX short) of the first device (TX) is shown. In this embodiment the time interval for the first cyclic repeated signal (TX short) of the first device is 0.1 ms.

The first cycle time of the first cycled repeated signal (TX) is shown with 1 ms.

This means, that the first signal of the first device needs a certain power consumption for maintaining the short cycle time with a corresponding high repeating rate. This is no problem, because the first device with the corresponding transmitter is arranged in the building.

The key (or second device) has time controlled activated intervals, in which the second device (car key) is in a receiving mode (RX). It is important to note, that the time scales for the signals (TX) and the receiving mode (RX) are quite different.

So in FIG. 2 is shown, that the second device or the key 5 respectively has a cycled repeating receiving mode (RX) for a determined first receiving time interval of 1.1 ms, which corresponds to the cycle time of 1 ms of the first data protocol of the first device (TX) to guarantee that at least one complete TX short signal is received. The cycle time of the first cycled repeat receiving mode of the second device is in a much larger time scale, for example 1000 ms as shown in FIG. 2. Having this time relations between the transmitted signal (TX) of the first device and the receiving mode (RX) of the second device it is sure, that there is a high probability, that in each receiving mode (RX) of the second device a first data protocol (TX short) of the first device can be received completely.

Figure 3:
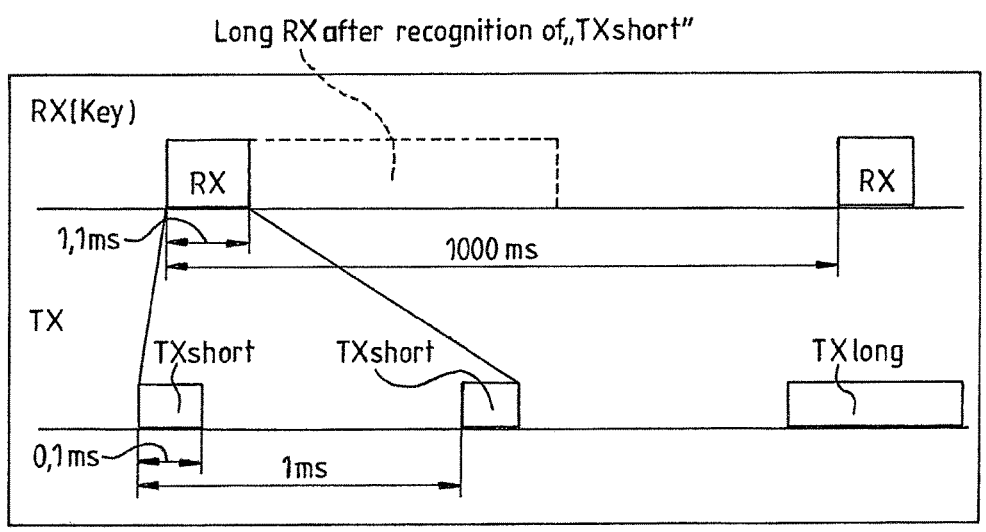
FIG. 3 shows another diagram as example of a timing with high amount of data.

In FIG. 3, an example for a timing with a higher amount of data is shown. The first cyclic repeated signal of the first device with a first data protocol (TX short) corresponds to (TX short) according to FIG. 2.

The first receiving mode of the second device (RX) corresponds to the first receiving mode (RX) in FIG. 2.

Now in addition to the first receiving mode (RX) a long receiving mode RX after recognition of a "TX short" data protocol is shown with dotted lines.

Furthermore a second cycled repeated signal of the first device (TX long) for authentication of a second device with a second data protocol within a second transmission time interval is shown in FIG. 3. This second cycled repeated signal of the first device can be initiated by a random jitter algorithm to vary the transmission timing and to avoid a repeated transmission crashing of different signals.

Since the long second receiving mode of the second device (long RX) has a time interval of about 500 ms it is clear, that during this time interval the second cyclic repeated signal of the first device with a second data protocol which takes about few ms starting after the last first cycled repeated signal of the first device (TX short) can be received completely during the second receiving mode of the second device.

As can be seen in this embodiment, the power consumption of the second device is reduced to a minimum, because the receiver of the second device can work in slowest cycle time which is acceptable from system design. The power consumption or current consumption is approximately proportional to the receiving cycle time of the second device.

The power consumption or the current consumption can be decreased down to acceptable values for small batteries (e. g. coin cell batteries) without significant reduction of battery lifetime.

A RF homologation to the different rules in different countries is significantly facilitated by the features of the present invention described above. Accordingly the operation distance or receiving range in an apparatus for locking or unlocking according to the present invention can be enlarged by the use of higher frequencies in particular VHF and/or UHF frequencies.

REFERENCE NUMBERS 1 building
2 first device
3 operator
4 second device
5 key
6 operation distance

The invention claimed is:

1. An apparatus for activating an electrically or electronically controlled appliance from an energy-saving passive state for controlling locking and unlocking of doors, comprising:
   a first device in the appliance; and
   an associated second device designed in the type of one of an electronic key, an ID-transponder, or a chip card,
   wherein the first device has at least a transmitter for electromagnetic signals, and the associated second device has at least a receiver for the electromagnetic signals,
   wherein the first device transmits a first cyclic repeated signal for the activation and/or authentication of the second device with a first data protocol within a first transmission time interval and with a first cycle time,
   wherein the second device has a cycled repeating receiving mode for a first receiving time interval which corresponds essentially to the first cycle time of the first data protocol of the first device,
   wherein preferably the first receiving time interval of the second device is longer than the first transmission time interval of the first data protocol of the first device.

2. The apparatus according to claim 1, wherein the first device transmits a second or more cyclic repeated signals for authentication of the second device with a second data protocol within a second transmission time interval and with a second cycle time,
   wherein the first transmission time interval is shorter than the second transmission time interval and the first cycle time is shorter than the second cycle time.

3. The apparatus according to claim 2, wherein a second receiving time interval of the second device in the receiving mode after receipt of the first data protocol corresponds essentially to a second cycle time of the second or more signals of the first device.

4. The apparatus according to claim 2, wherein the second or more signals of the first device is divided in two or more blocks.

5. The apparatus according to claim 1, wherein the first receiving time interval of the second device is essentially a multiple of the first transmission time interval of the first data protocol.

6. The apparatus according to claim 1, wherein the first receiving time interval of the second device, which corresponds essentially to the first cycle time of the first device, is for activation of the second device.

7. The apparatus according to claim 1, wherein after receipt of the first data protocol of the first device the second device remains or comes in a receiving mode during a second receiving time intervals, within that the second or more signals of the first device for authentication of the second device with a second data protocol can be received completely by the second device.

8. The apparatus according to claim 1, wherein in case of an at least partial overlap of the first receiving time interval of the second device with the second transmission time interval of the first device, the second device remains or comes in a receiving mode during a third receiving time interval, within that the second or more signals of the first device with the second data protocol can be completely received by the second device.

9. The apparatus according to claim 1, wherein a frequency of the carrier wave for the first signal and/or a second signal is in a VHF-range (30 MHz to 300 MHz) and/or a UHF-range (300 MHz to 3 GHz).

10. The apparatus according to claim 9, wherein the frequency of the carrier wave for the first and/or second signal is higher than 100 MHz.

11. The apparatus according to claim 10, wherein the frequency of the carrier wave for the first and/or second signal is in an ISM band from 433.05 MHz to 434.79 MHz and/or in the ISM band from 902 MHz to 928 MHz.

* * * * *